US008631691B2

(12) United States Patent
Tanaka

(10) Patent No.: US 8,631,691 B2
(45) Date of Patent: Jan. 21, 2014

(54) ABNORMALITY DETECTION DEVICE FOR EGR DEVICE

(75) Inventor: Takayoshi Tanaka, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 18 days.

(21) Appl. No.: 13/505,225

(22) PCT Filed: Dec. 9, 2010

(86) PCT No.: PCT/JP2010/072143
§ 371 (c)(1), (2), (4) Date: Apr. 30, 2012

(87) PCT Pub. No.: WO2012/077214
PCT Pub. Date: Jun. 14, 2012

(65) Prior Publication Data

US 2012/0240671 A1 Sep. 27, 2012

(51) Int. Cl.
*G01M 15/04* (2006.01)

(52) U.S. Cl.
USPC ........................................ 73/114.74

(58) Field of Classification Search
USPC ........................................ 73/114.74
See application file for complete search history.

(56) References Cited

U.S. PATENT DOCUMENTS

| | | | | |
|---|---|---|---|---|
| 4,671,107 | A * | 6/1987 | Chiesa et al. | 73/114.74 |
| 6,085,732 | A * | 7/2000 | Wang et al. | 123/568.12 |
| 6,842,690 | B2 * | 1/2005 | Akao et al. | 701/114 |
| 6,904,792 | B2 * | 6/2005 | Wakahara | 73/114.39 |
| 6,993,908 | B2 * | 2/2006 | Akao et al. | 60/602 |
| 7,100,586 | B2 * | 9/2006 | Matsumoto | 123/568.16 |
| 7,671,601 | B2 * | 3/2010 | Takayama | 324/503 |
| 8,316,828 | B2 * | 11/2012 | Whitney et al. | 123/568.16 |
| 2011/0011378 | A1 * | 1/2011 | Nakamura | 123/568.16 |

FOREIGN PATENT DOCUMENTS

| | | | |
|---|---|---|---|
| JP | 62-170761 | A | 7/1987 |
| JP | 2002-227727 | A | 8/2002 |
| JP | 2005-291056 | A | 10/2005 |
| JP | 2006-177257 | A | 7/2006 |
| JP | 2006-257881 | A | 9/2006 |
| JP | 2009-137531 | A | 6/2009 |
| JP | 2009-257223 | A | 11/2009 |

OTHER PUBLICATIONS

International Search Report & Written Opinion mailed Jan. 18, 2011 of PCT/JP2010/072143.

* cited by examiner

*Primary Examiner* — Freddie Kirkland, III
(74) *Attorney, Agent, or Firm* — Kenyon & Kenyon LLP

(57) ABSTRACT

An abnormality detection device for detecting abnormalities in an EGR device for an internal combustion engine with a supercharger. The abnormality detection device includes an $O_2$ sensor which is installed in an EGR path and disposed on the exhaust path side relative to the EGR valve, and an A/F sensor which is installed in the exhaust path and disposed downstream of a connecting portion between the exhaust path and the EGR path.

4 Claims, 2 Drawing Sheets

34 16 30 12 18 14 36 32 Route 1 2 38 22 42 10 6 44 8 20 24 Intake air Exhaust gas 4 40

ABNORMALITY DETECTION DEVICE FOR EGR DEVICE

CROSS REFERENCE TO RELATED APPLICATIONS

This is a 371 national phase application of PCT/JP2010/072143 filed 09 Dec. 2010, the contents of which are incorporated herein by reference.

TECHNICAL FIELD

The present invention relates to an abnormality detection device for an EGR device, and more specifically, to an abnormality detection device for an EGR device mounted on an internal combustion engine with a supercharger.

BACKGROUND ART

Some of currently used internal combustion engines for vehicles include an EGR device that is capable of recirculating part of exhaust gas to the intake side for the purpose of improving emissions performance. The EGR device includes an EGR valve, which is installed in an EGR path that connects an intake path of an internal combustion engine to an exhaust path, and controls the degree of opening of the EGR valve to adjust the amount of exhaust gas recirculated from the exhaust side to the intake side. A certain abnormality may occur in the EGR device so that it is unable to close or open the EGR valve. An abnormality in the EGR device affects the emissions performance. Therefore, when such an abnormality occurs, it should be immediately addressed or reported to a driver. In such an instance, an abnormality detection device for an EGR device that is described, for instance, in JP-A-2002-227727 is required. The device described in JP-A-2002-227727 (hereinafter referred to as the conventional device) estimates an intake pressure generated during a normal operation of the EGR device based on a throttle opening, an EGR valve opening, and an internal combustion engine speed, and then calculates the deviation between the estimated intake pressure and an actual intake pressure. When the deviation is not smaller than a predetermined value, the conventional device concludes that the EGR device is abnormal.

Meanwhile, the EGR device is also mounted on an internal combustion engine with a supercharger. The internal combustion engine with a supercharger is characterized in that its intake pressure is higher than back pressure in a certain operating region. A particularly serious abnormality that may occur in the EGR device mounted on such an internal combustion engine with a supercharger is the inability of the EGR valve to close due to trapped foreign matter or a fault. This causes the EGR valve to remain open. If the EGR valve is unable to close, fresh air may flow backward from the intake path to the exhaust path in a certain operating region of the internal combustion engine, and then flow into an EGR catalyst and a start catalyst, thereby causing the catalysts to overheat. In view of the above circumstances, it is demanded that the abnormality detection device for the EGR device mounted on the internal combustion engine with a supercharger accurately detect the inability of the EGR valve to close.

However, it is difficult for the aforementioned conventional device to fulfill such a demand. The reason is that the conventional device detects an abnormality in accordance with the deviation between the estimated intake pressure and the actual intake pressure. More specifically, even if the EGR device is abnormal, there is no significant deviation between the estimated intake pressure and the actual intake pressure in an operating region where the intake pressure is higher than the back pressure. In a certain operating region, therefore, the conventional device may fail to detect an abnormality in the EGR device. This may result in delayed abnormality detection.

PRIOR ART LITERATURE

Patent Documents

Patent Document 1: JP-A-2002-227727
Patent Document 2: JP-A-2009-257223

SUMMARY OF THE INVENTION

An object of the present invention is to accurately detect an abnormality in an EGR device for an internal combustion engine with a supercharger, or more specifically, the inability of an EGR valve to fully close due to trapped foreign matter or a fault. To achieve the object, the present invention provides the following abnormality detection device for the EGR device.

The abnormality detection device for the EGR device, which is provided by the present invention, adjusts the amount of gas recirculated from an exhaust path to an intake path of the internal combustion engine with a supercharger by controlling the degree of opening of the EGR valve disposed in an EGR path that connects the intake path to the exhaust path. The abnormality detection device includes a pair of sensors that each output a signal capable of identifying whether the air-fuel ratio of a gas passing therethrough is lean or rich. A first sensor, which is one of the pair of sensors, is installed in the EGR path and disposed on the exhaust path side relative to the EGR valve. A second sensor, which is the remaining one of the pair of sensors, is installed in the exhaust path and disposed downstream of a connecting portion between the exhaust path and the EGR path. An $O_2$ sensor whose signal varies with the concentration of oxygen and an A/F sensor whose signal varies with the air-fuel ratio (A/F) may be used as the first and second sensors.

The abnormality detection device uses a signal output from the first sensor and a signal output from the second sensor to judge whether there is an abnormality in the EGR device. More specifically, if the signal output from the first sensor indicates leanness while the internal combustion engine is conducting a stoichiometric or rich operation and if the signal output from the second sensor subsequently indicates leanness within a predetermined time range according to the operating status of the internal combustion engine, the abnormality detection device concludes that the EGR valve is unable to close. Further, when the signal output from the first sensor cyclically alternates between the lean side and the rich side while the internal combustion engine is conducting a stoichiometric or rich operation and when the cycle of alternation coincides with the cycle of intake pulsation, the abnormality detection device also concludes that the EGR valve is unable to close.

In other words, the abnormality detection device detects a backflow of fresh air in the EGR path as an evidence of the inability of the EGR valve to close. Hence, the abnormality detection device can accurately detect the inability of the EGR valve to close in the internal combustion engine with a supercharger.

BEST MODE FOR CARRYING OUT THE INVENTION

First Embodiment

A first embodiment of the present invention will now be described with reference to the accompanying drawings.

Figure 1:
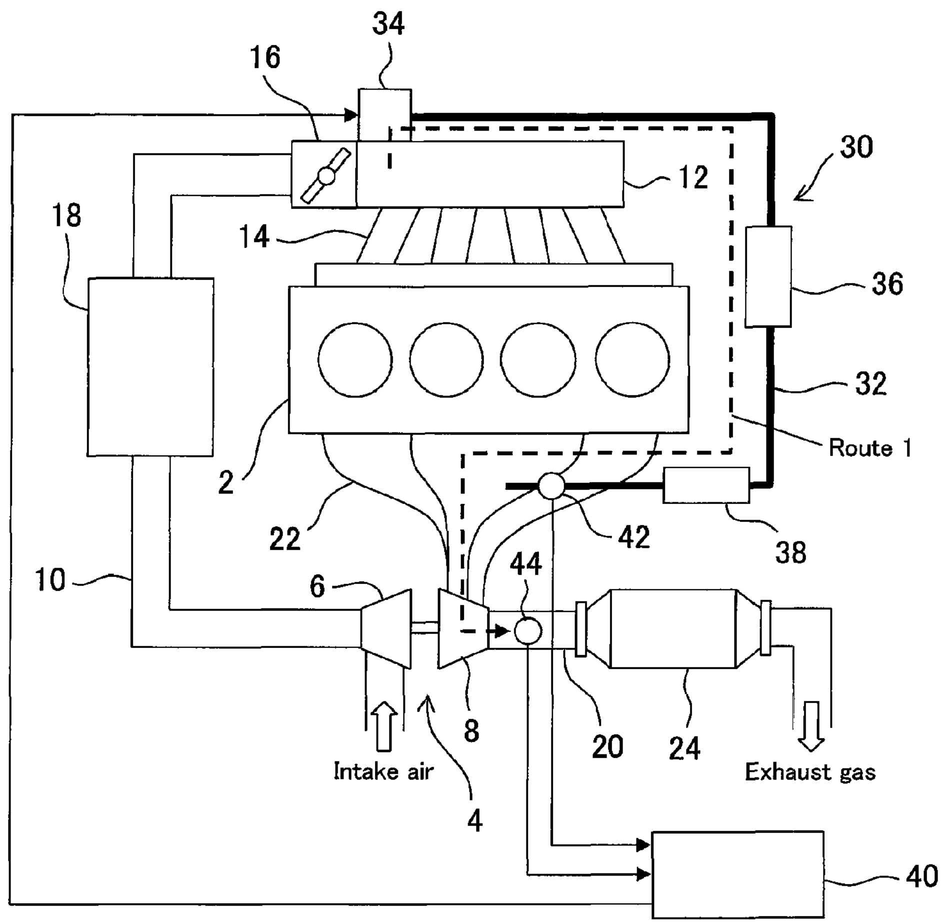
FIG. 1 is a schematic diagram illustrating the configuration of an internal combustion engine with a supercharger to which an abnormality detection device for an EGR device according to a first embodiment of the present invention is applied.

FIG. 1 is a schematic diagram illustrating the configuration of an internal combustion engine with a supercharger to which an abnormality detection device for an EGR device according to a first embodiment of the present invention is applied. The internal combustion engine with a supercharger according to the first embodiment is a spark-ignition internal combustion engine that operates mainly at a stoichiometric air-fuel ratio or at an air-fuel ratio close to the stoichiometric one.

The internal combustion engine with a supercharger according to the present embodiment includes a turbocharger 4 that uses the energy of exhaust gas to compress air (fresh air). A compressor 6 for the turbocharger 4 is disposed in an intake path 10. A turbine 8 for the turbocharger 4 is disposed in an exhaust path 20. An inter-cooler 18 is installed in the intake path 10 and disposed downstream of the compressor 6. A throttle 16 is disposed downstream of the inter-cooler 18. A surge tank 12 is installed in the intake path 10, disposed downstream of the throttle 16, and connected to an engine main body 2 through an intake manifold 14. An exhaust manifold 22 is mounted on the exhaust side of the engine main body 2. The outlet of the exhaust manifold 22 is connected to the turbine 8. A start catalyst 24 is installed in the exhaust path 20 and disposed downstream of the turbine 8. In this document, it is assumed that the surge tank 12 and the intake manifold 14 are parts of the intake path 10, and that the exhaust manifold 22 is a part of the exhaust path 20.

The internal combustion engine with a supercharger according to the present embodiment includes an EGR device 30 that recirculates exhaust gas from an exhaust system to an intake system. The EGR device 30 includes an EGR path 32, which connects the surge tank 12 to the exhaust manifold 22, and an EGR valve 34, an EGR cooler 36, and an EGR catalyst 38, which are disposed in the EGR path 32. The EGR valve 34 is positioned nearest the surge tank 12. The EGR catalyst 38 is positioned near the exhaust manifold 22. The EGR cooler 36 is positioned between the EGR valve 34 and the EGR catalyst 38.

The internal combustion engine with a supercharger according to the present embodiment includes a pair of sensors that each output a signal capable of identifying whether the air-fuel ratio of a gas passing therethrough is lean or rich. One of the pair of sensors is an $O_2$ sensor 42, which is installed in the EGR path 32 and disposed near the exhaust manifold 22 rather than the EGR catalyst 38. The remaining one of the pair of sensors is an A/F sensor 44, which is installed in the exhaust path 20 and disposed between the turbine 8 and the start catalyst 24. The $O_2$ sensor 42 outputs a signal corresponding to the concentration of oxygen, and has such output characteristics in which its output greatly changes when the air-fuel ratio increases above or decreases below the stoichiometric level. The A/F sensor 44 outputs a signal corresponding to the air-fuel ratio of exhaust gas, and has such output characteristics that its output changes linearly with a change in the air-fuel ratio. The signals output from the $O_2$ sensor 42 and A/F sensor 44 are input into an ECU (electronic control unit) 40. Upon receipt of signals from various sensors such as the $O_2$ sensor 42 and A/F sensor 44, the ECU 40 operates various actuators such as the EGR valve 34 in accordance with a predetermined control program.

The above two sensors 42, 44 can be used to detect an abnormality in the EGR valve 34, or more specifically, the inability of the EGR valve 34 to close due to trapped foreign matter or a fault. While the internal combustion engine is conducting a stoichiometric or rich operation, the output signal of the $O_2$ sensor 42 usually indicates richness or its indication cyclically alternates between leanness and richness in synchronism with the cycle of air-fuel ratio feedback control. Further, the output signal of the A/F sensor 44 changes in accordance with a target air-fuel ratio of the internal combustion engine. However, if the EGR valve 34 does not close and remains open, fresh air flows backward from the surge tank 12 to the exhaust manifold 22, as indicated by “ROUTE 1” in FIG. 1, in an operating region where intake pressure is higher than back pressure. As a result, the atmosphere around the $O_2$ sensor 42 is lean so that the output signal of the $O_2$ sensor 42 persistently indicates leanness. The exhaust gas is then diluted by the fresh air introduced into the exhaust manifold 22 so that the output signal of the A/F sensor 44 also indicates leanness. Therefore, when the internal combustion engine is conducting a stoichiometric or rich operation, if the output signal of the $O_2$ sensor 42 persistently indicates leanness and subsequently, the output signal of the A/F sensor 44 indicates leanness, it can be concluded that the EGR valve 34 may be left open due to its inability to close.

Figure 2:
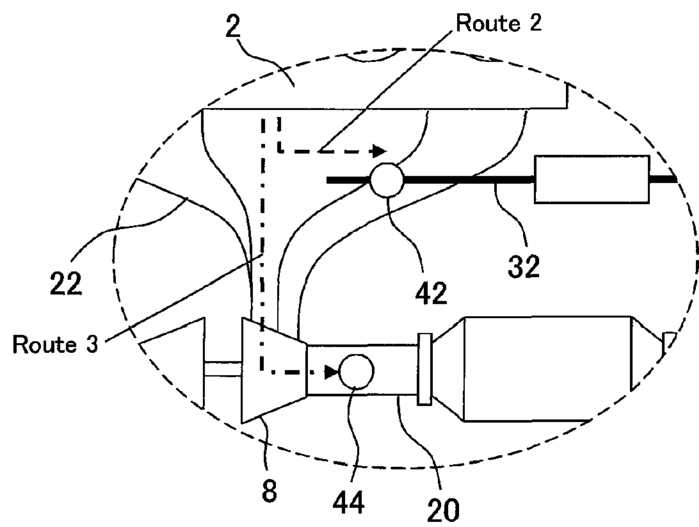
FIG. 2 is an enlarged view illustrating essential parts shown in FIG. 1.

However, the above situation may also occur when a fuel injection system of the engine main body 2 is abnormal. For example, when the amount of fuel injection is insufficient due, for instance, to a clogged injector or a decreased fuel pressure, the air-fuel ratio of the exhaust gas discharged from the engine main body 2 is lean. In this instance, as indicated by “ROUTE 2” in the enlarged view of FIG. 2, the lean exhaust gas first reaches the $O_2$ sensor 42, which is relatively near the engine main body 2. Thus, the output signal of the $O_2$ sensor 42 persistently indicates leanness. Subsequently, as indicated by “ROUTE 3” in the enlarged view of FIG. 2, the lean exhaust gas reaches the A/F sensor 44, which is positioned apart from the engine main body 2. Thus, the output signal of the A/F sensor 44 changes to indicate leanness. To detect an abnormality in the EGR valve 34 by using the output signals of the $O_2$ sensor 42 and A/F sensor 44, therefore, it is necessary to devise a decision logic capable of differentiating an EGR valve abnormality from a fuel injection system abnormality.

As such being the case, the time lag between the instant at which the output signal of the $O_2$ sensor 42 persistently indicates leanness and the instant at which the output signal of the A/F sensor 44 changes to indicate leanness is the focus of attention. The time lag encountered when the EGR valve 34 is abnormal is different from the time lag encountered when the fuel injection system is abnormal. When the fuel injection system is abnormal, the time lag is determined by the flow velocity of exhaust gas and the distance difference between “ROUTE 3” and “ROUTE 2” in FIG. 2. As the flow velocity of exhaust gas is determined by the operating status such as an engine speed and load, the time lag encountered when the fuel injection system is abnormal can be estimated by calculations. Therefore, if an actually measured time lag is equal to the estimated time lag that is to be encountered when the fuel injection system is abnormal or if the difference between these two time lag values is within an error range, it can be concluded that a currently encountered abnormality is in the fuel injection system and not in the EGR valve 34. In other words, if the actually measured time lag is substantially different from the estimated time lag, it can be concluded that the EGR valve 34 is abnormal, that is, the EGR valve 34 is left open and unable to close.

The abnormality detection device according to the present embodiment uses the above-described decision logic to judge whether the EGR valve 34 is abnormal. The abnormality detection device according to the present embodiment is implemented when the ECU 40 functions as abnormality judgment means of the abnormality detection device. When the ECU 40 functions as such abnormality judgment means, the ECU 40 executes an abnormality judgment routine shown in the flowchart of FIG. 3. The routine is executed at regular intervals during an operation of the internal combustion engine.

Figure 3:
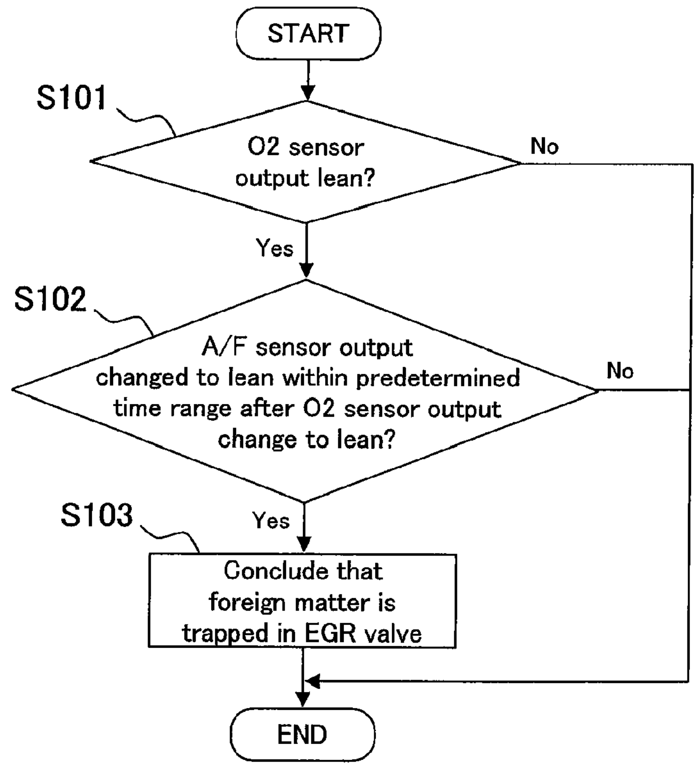
FIG. 3 is a flowchart illustrating an EGR valve abnormality judgment routine that is executed by an ECU in the first embodiment of the present invention.

In step S101, which is the first step, the routine shown in FIG. 3 judges whether the output signal of the $O_2$ sensor 42 persistently indicates leanness. When the judgment result is negative, the routine terminates because it can be inferred that the EGR valve 34 is normally operating.

When, on the other hand, the judgment result obtained in step S101 is affirmative, the routine proceeds to step S102 for judgment purposes. The routine performs step S102 to distinguish between an abnormality in the EGR valve 34 and an abnormality in the fuel injection system. More specifically, the routine judges whether the output signal of the A/F sensor 44 has changed to indicate leanness within a predetermined period of time after leanness is persistently indicated by the output signal of the $O_2$ sensor 42. The predetermined period of time excludes the interval between the instant at which the output signal of the $O_2$ sensor 42 persistently indicates leanness in a situation where the fuel injection system is abnormal and the instant at which the output signal of the A/F sensor 44 indicates leanness, and is calculated from the operating status such as the engine speed and load. When the judgment result obtained in step S102 is negative, the routine terminates because it can be inferred that the fuel injection system is abnormal whereas the EGR valve 34 is normally operating.

When, on the other hand, the judgment result obtained in step S102 is affirmative, the routine proceeds to step S103 and concludes that the EGR valve 34 is abnormal. More specifically, the routine concludes that the EGR valve 34 is left open and unable to close. When the EGR valve 34 is left open to the extent that the fresh air flows backward, it is highly probable that foreign matter is trapped in the EGR valve 34. In step S103, therefore, it can be concluded that foreign matter is trapped in the EGR valve 34.

Second Embodiment

A second embodiment of the present invention will now be described with reference to the accompanying drawings.

The abnormality detection device for the EGR device according to the second embodiment of the present invention is applied to the internal combustion engine with a supercharger that is configured as shown in FIG. 1, as is the case with the abnormality detection device according to the first embodiment. The second embodiment differs from the first embodiment in the functionality of the ECU 40, which serves as the abnormality judgment means. More specifically, the difference between the first and second embodiments lies in the method of judging whether the EGR valve 34 is left open and unable to close due to trapped foreign matter or a fault. The abnormality judgment method described in connection with the first embodiment is effective for detecting a state where the EGR valve 34 is left wide open to the extent that a large amount of fresh air flows into the exhaust manifold 22. However, if a state where the EGR valve 34 is slightly open and unable to close is to be detected, the abnormality judgment method according to the second embodiment, which will be described below, is more effective than the abnormality judgment method according to the first embodiment.

In the present embodiment, a change in inversion cycle of an output signal from the $O_2$ sensor 42 is the focus of attention. While the EGR valve 34 is slightly open, the fresh air flows backward from the surge tank 12 to the EGR path 32; however, the amount of such fresh air is not large. Therefore, the fresh air introduced into the EGR path 32 is repeatedly pushed toward the exhaust manifold 22 and returned toward the surge tank 12. As a result, the atmosphere around the $O_2$ sensor 42 alternates between richness and leanness so that the output signal of the $O_2$ sensor 42 repeatedly inverts to alternate between leanness and richness in the same cycle as the cycle of intake pulsation. The output signal of the $O_2$ sensor 42 also repeatedly inverts to alternate between leanness and richness while the internal combustion engine is conducting a stoichiometric operation. However, the cycle of such inversion is the same as the cycle of air-fuel ratio feedback control. Thus, this inversion cycle is distinctively different from the inversion cycle prevailing when the EGR valve 34 is left open. Therefore, measuring the inversion cycle of the output signal from the $O_2$ sensor 42 makes it possible to accurately judge whether the EGR valve 34 is left open.

Figure 4:
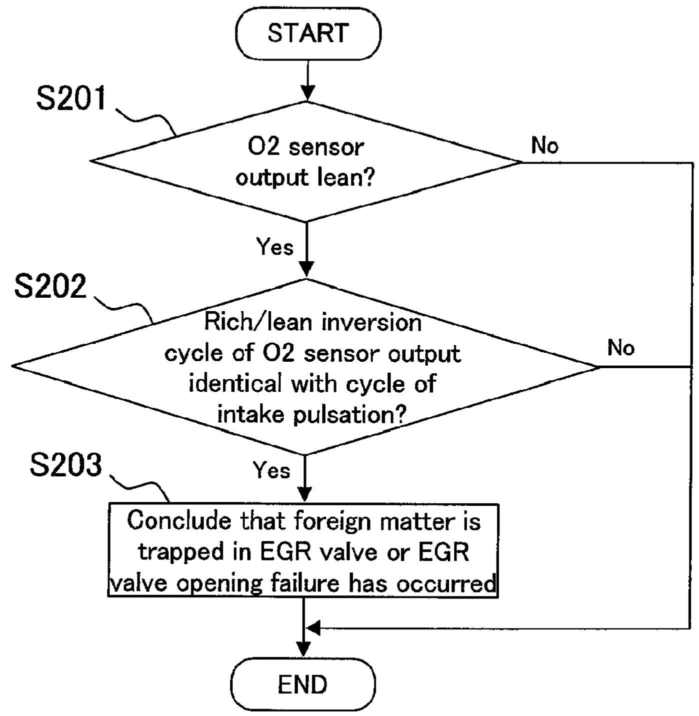
FIG. 4 is a flowchart illustrating an EGR valve abnormality judgment routine that is executed by the ECU in a second embodiment of the present invention.

The abnormality detection device according to the present embodiment uses the above-described decision logic to judge whether the EGR valve 34 is abnormal. FIG. 4 is a flowchart illustrating an EGR valve abnormality judgment routine that is executed by the ECU 40 in the present embodiment. The routine is executed at regular intervals during an operation of the internal combustion engine.

In step S201, which is the first step, the routine shown in FIG. 4 judges whether the output signal of the $O_2$ sensor 42 has changed to indicate leanness. In a situation where the EGR valve 34 is slightly open and unable to close, the fresh air flowing back and forth in the EGR path 32 reaches the $O_2$ sensor 42 due to intake pulsation. This causes the output signal of the $O_2$ sensor 42 to at least change temporarily to indicate leanness instead of indicating leanness persistently. Therefore, when the judgment result obtained in step S201 is negative, the routine terminates because it can be inferred that the EGR valve 34 is normally operating.

When, on the other hand, the judgment result obtained in step S201 is affirmative, the routine proceeds to step S202 for judgment purposes. In step S202, the routine calculates the inversion cycle of the output signal from the $O_2$ sensor 42 and compares it against the cycle of intake pulsation. The intake pulsation cycle can be calculated, for instance, from the operating status such as the engine speed. When the inversion cycle of the output signal from the $O_2$ sensor 42 does not coincide with the intake pulsation cycle, the routine terminates because it can be inferred that the EGR valve 34 is normally operating.

When, on the other hand, the judgment result obtained in step S202 is affirmative, the routine proceeds to step S203 and concludes that the EGR valve 34 is abnormal. More specifically, the routine concludes that the EGR valve 34 is left open and unable to close. If, for example, small foreign matter is trapped in the EGR valve 34 or an opening failure has occurred in the EGR valve 34, the EGR valve 34 may be left open to the extent that the output signal of the $O_2$ sensor 42 is affected by intake pulsation.

Other

It should be understood that the present invention is not limited to the foregoing embodiments. The present invention extends to various modifications that nevertheless fall within the scope and spirit of the present invention. For example, the foregoing embodiments may be modified as described below.

The $O_2$ sensor 42 may be replaced by an A/F sensor. Further, the A/F sensor 44 may be replaced by an $O_2$ sensor.

The intake side of the EGR path 32 may be connected to the intake manifold 14 instead of the surge tank 12. When such an alternative connection is made, the leading end of the EGR path 32 should be branched off for each cylinder to supply the exhaust gas to each cylinder.

The turbocharger 4 may be replaced by a mechanical supercharger that is driven by torque acquired from an output shaft of the engine main body 2.

It is preferred that the abnormality judgment method according to the second embodiment be combined with the abnormality judgment method according to the first embodiment. More specifically, it is preferred that the ECU 40 check for an abnormality by executing both the routine shown in the flowchart of FIG. 2 and the routine shown in the flowchart of FIG. 3. When the ECU 40 executes these two routines, an abnormality in the EGR valve 34 can be accurately detected no matter whether the abnormality is such that the EGR valve 34 is open wide and unable to close or slightly open and unable to close.

DESCRIPTION OF REFERENCE NUMERALS

2 Engine main body
4 Turbocharger
10 Intake path
12 Surge tank
14 Intake manifold
16 Throttle
20 Exhaust path
22 Exhaust manifold
24 Start catalyst
30 EGR device
32 EGR path
34 EGR valve
38 EGR catalyst
40 ECU
42 $O_2$ sensor
44 A/F sensor

The invention claimed is:

1. An abnormality detection device for an EGR device that adjusts the amount of gas recirculated from an exhaust path to an intake path of an internal combustion engine with a supercharger by controlling the degree of opening of an EGR valve disposed in an EGR path that connects the intake path to the exhaust path, the abnormality detection device comprising:

a first sensor that is installed in the EGR path and disposed on the exhaust path side relative to the EGR valve, and outputs a signal capable of identifying whether the air-fuel ratio of a gas passing therethrough is lean or rich;

a second sensor that is installed in the exhaust path and disposed downstream of a connecting portion between the exhaust path and the EGR path, and outputs a signal capable of identifying whether the air-fuel ratio of a gas passing therethrough is lean or rich; and an abnormality judgment device that uses the signal output from the first sensor and the signal output from the second sensor to judge whether the EGR device is abnormal;

wherein, when the signal output from the first sensor indicates leanness while the internal combustion engine is conducting a stoichiometric or rich operation and when the signal output from the second sensor subsequently indicates leanness within a predetermined time range according to the operating status of the internal combustion engine, the abnormality judgment device concludes that the EGR valve is unable to close.

2. The abnormality detection device according to claim 1, wherein, when the signal output from the first sensor cyclically alternates between the lean side and the rich side while the internal combustion engine is conducting a stoichiometric or rich operation and when the cycle of alternation coincides with the cycle of intake pulsation, the abnormality judgment device concludes that the EGR valve is unable to close.

3. An abnormality detection device for an EGR device that adjusts the amount of gas recirculated from an exhaust path to an intake path of an internal combustion engine with a supercharger by controlling the degree of opening of an EGR valve disposed in an EGR path that connects the intake path to the exhaust path, the abnormality detection device comprising:

a first sensor that is installed in the EGR path and disposed on the exhaust path side relative to the EGR valve, and outputs a signal capable of identifying whether the air-fuel ratio of a gas passing therethrough is lean or rich;

a second sensor that is installed in the exhaust path and disposed downstream of a connecting portion between the exhaust path and the EGR path, and outputs a signal capable of identifying whether the air-fuel ratio of a gas passing therethrough is lean or rich; and a computer that is programmed to judge whether the EGR device is abnormal by using the signal output from the first sensor and the signal output from the second sensor;

wherein, the computer is programmed to conclude that the EGR valve is unable to close when the signal output from the first sensor indicates leanness while the internal combustion engine is conducting a stoichiometric or rich operation and when the signal output from the second sensor subsequently indicates leanness within a predetermined time range according to the operating status of the internal combustion engine.

4. The abnormality detection device according to claim 3, wherein, the computer is further programmed to conclude that the EGR valve is unable to close when the signal output from the first sensor cyclically alternates between the lean side and the rich side while the internal combustion engine is conducting a stoichiometric or rich operation and when the cycle of alternation coincides with the cycle of intake pulsation.

* * * * *